United States Patent [19]
Reinehr et al.

[11] Patent Number: 5,803,212
[45] Date of Patent: Sep. 8, 1998

[54] GRATING SYSTEM

[75] Inventors: Paul-Werner Reinehr, Iserlohn-Rheinen; Günter Dieterich, Dortmund; Hans-Werner Schulte, Schwerte; Karlheinz Piel, Schwerte; Dirk Fenger, Lippstadt, all of Germany

[73] Assignee: Hoesch Aktiengesellschaft, Dortmund, Germany

[21] Appl. No.: 123,700

[22] Filed: Sep. 17, 1993

Related U.S. Application Data

[63] Continuation of Ser. No. 887,687, May 22, 1992, abandoned.

[30] Foreign Application Priority Data

May 25, 1991 [DE] Germany .......................... 41 17 194.2

[51] Int. Cl.⁶ ................................ F16F 7/12; F42B 33/06
[52] U.S. Cl. ........................... 188/372; 267/116; 267/139; 89/36.09
[58] Field of Search ..................... 188/371–376; 267/139, 140; 293/107–110, 126, 132, 134–138; 89/36.02, 36.09; 454/194; 109/78; 237/79

[56] References Cited

U.S. PATENT DOCUMENTS

| | | | |
|---|---|---|---|
| 3,736,838 | 6/1973 | Butterweck et al. | 89/36.08 |
| 3,765,299 | 10/1973 | Pagano et al. | 89/36.08 |
| 3,848,508 | 11/1974 | Bullinger | 89/36.08 |
| 3,869,165 | 3/1975 | Miller | 267/140 |
| 3,900,222 | 8/1975 | Muller | 293/110 |
| 3,930,665 | 1/1976 | Ikawa | 188/376 |
| 4,036,104 | 7/1977 | Pagano et al. | 89/36.02 |
| 4,325,283 | 4/1982 | Bemiss | 89/36.08 |
| 4,366,885 | 1/1983 | Vrijburg | 293/110 |
| 4,592,580 | 6/1986 | Stangenelli et al. | 293/136 |
| 4,727,789 | 3/1988 | Katsanis et al. | 89/36.08 |
| 4,822,011 | 4/1989 | Goldbach et al. | 293/136 |
| 4,852,704 | 8/1989 | Brockenbrough et al. | 293/135 |
| 4,884,919 | 12/1989 | Moore | 267/139 |
| 4,936,400 | 6/1990 | Blumbach et al. | 180/68.6 |
| 5,022,307 | 6/1991 | Gibbons, Jr. et al. | 89/36.08 |

Primary Examiner—Robert J. Oberleitner
Assistant Examiner—Chris Schwartz
Attorney, Agent, or Firm—Max Fogiel

[57] ABSTRACT

A grating system (1) with parallel lengths (5) of structural section is accommodated in a frame. It is intended for armored special-enough vehicles and or stationary units. The object is to optimize protection against a strike or impact. Energy absorbers are interposed between the system and the vehicle or unit that accommodates it.

2 Claims, 3 Drawing Sheets

GRATING SYSTEM

The present application is a continuation of the parent application Ser. No. 887,687 filed May 22, 1992, now abandoned.

BACKGROUND OF THE INVENTION

Grating systems for special-purpose vehicles are known from German OS 3 703 716, 4 028 124, and 4 015 304 for example. Protection against a strike or impact is improved in these systems by increasing the amount of material used, by combining various materials, and/or by specially designing, positioning, and/or fastening strips of structural section incorporated into the system.

SUMMARY OF THE INVENTION

The object of the present invention is to further improve the known grating systems with respect to protection against a strike or impact.

The attachment between the surface of the grating system exposed to a strike or impact and the energy absorbers can or cannot be disassembled or removed.

An attachment that cannot be removed can be attained by welding, soldering, cementing, or mechanisms that cannot be disengaged. An attachment that can be removed can be attained by insertion with or without cotter pins, screws, or other mechanical structures that can disengage.

The energy absorbers can be any such conventional springs or dashpots as cup springs, coils intended for compression and/or tension, compression springs with a round, rectangular, semicircular, or contoured cross-section, rubber pads, bellows, plastic springs, resilient compression structures (of metallic or non-metallic, organic or inorganic materials), suppression plates, resilient braided-wire components, rubber or rubbery materials, vibrating metals designed to act as buffers in rubber-to-metal joints, hydraulic and compressed-gas energy absorbers, or sundry energy absorbers.

The improvement attained by the present invention accordingly depends on the possibility of eliminating, with the energy absorber, some amount of kinetic energy needed to penetrate the grating when a foreign body collides with it and hence increase ballistic defense at the same or less weight.

Embodiments of the grating system in accordance with the invention will now be specified with reference to the schematic drawing.

DESCRIPTION OF THE PREFERRED EMBODIMENTS

Figure 1:
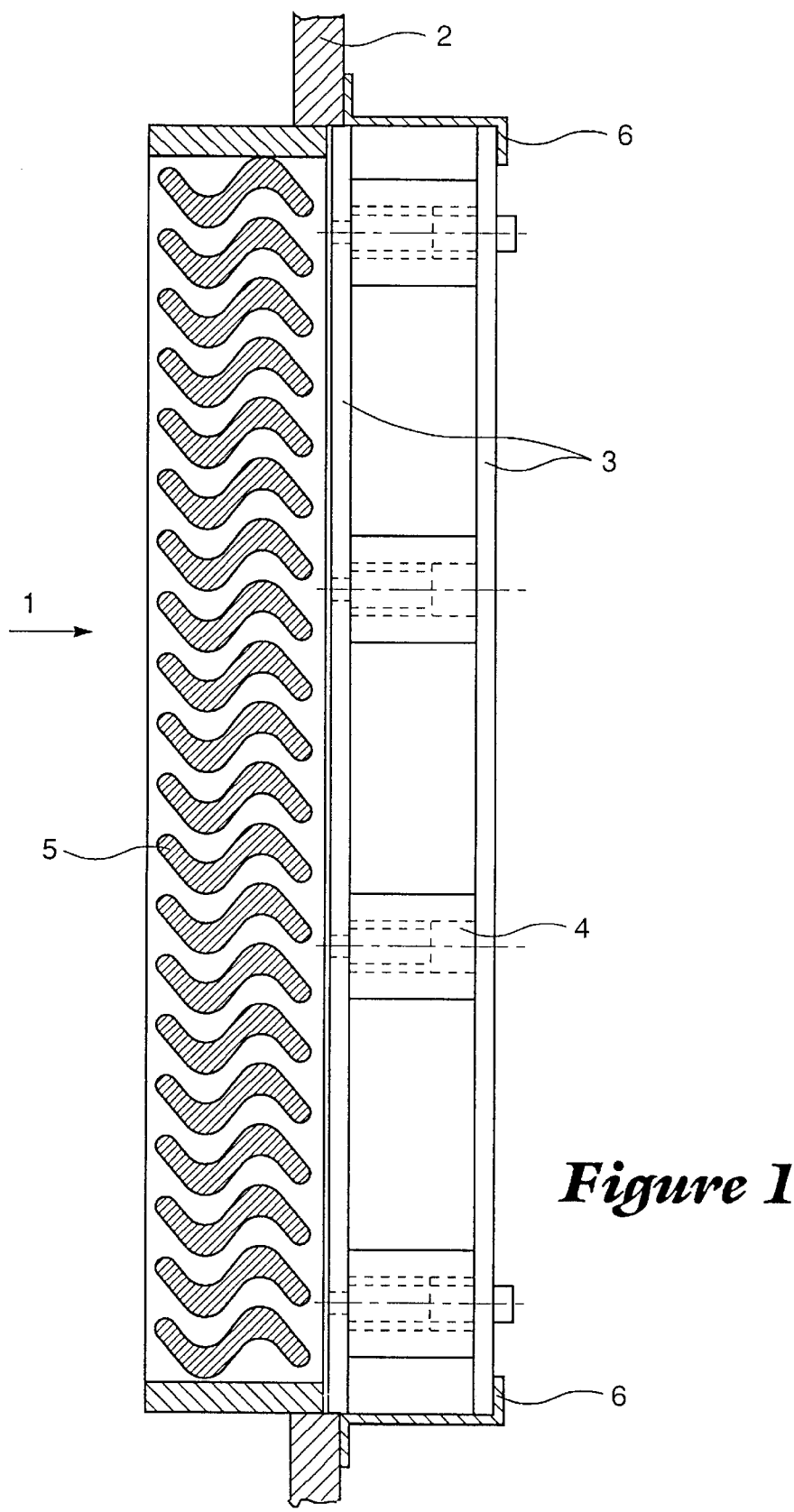
FIG. 1 is a section through a grating system.

Energy absorbers 4 are as illustrated in FIG. 1 secured in a frame 3 mounted in a holder 6 on the wall 2 of an unillustrated special-purpose vehicle. In the event of a strike or impact, grating system 1 moves along with its strips 5 of structural section against frame 3 and energy absorbers 4 in holder 6, absorbing some of the kinetic energy.

Figure 2:
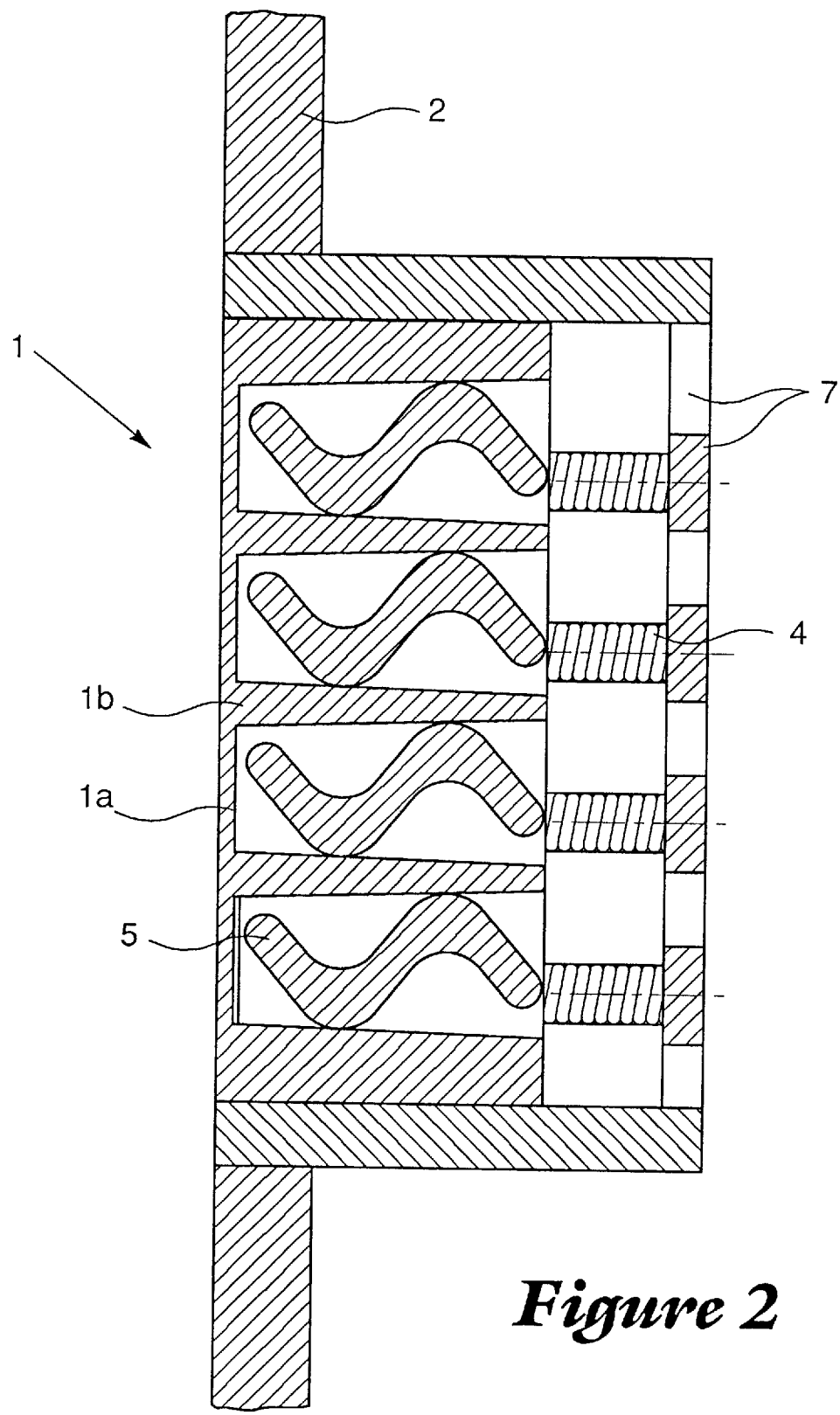
FIG. 2 a section through another grating system.
Figure 3:
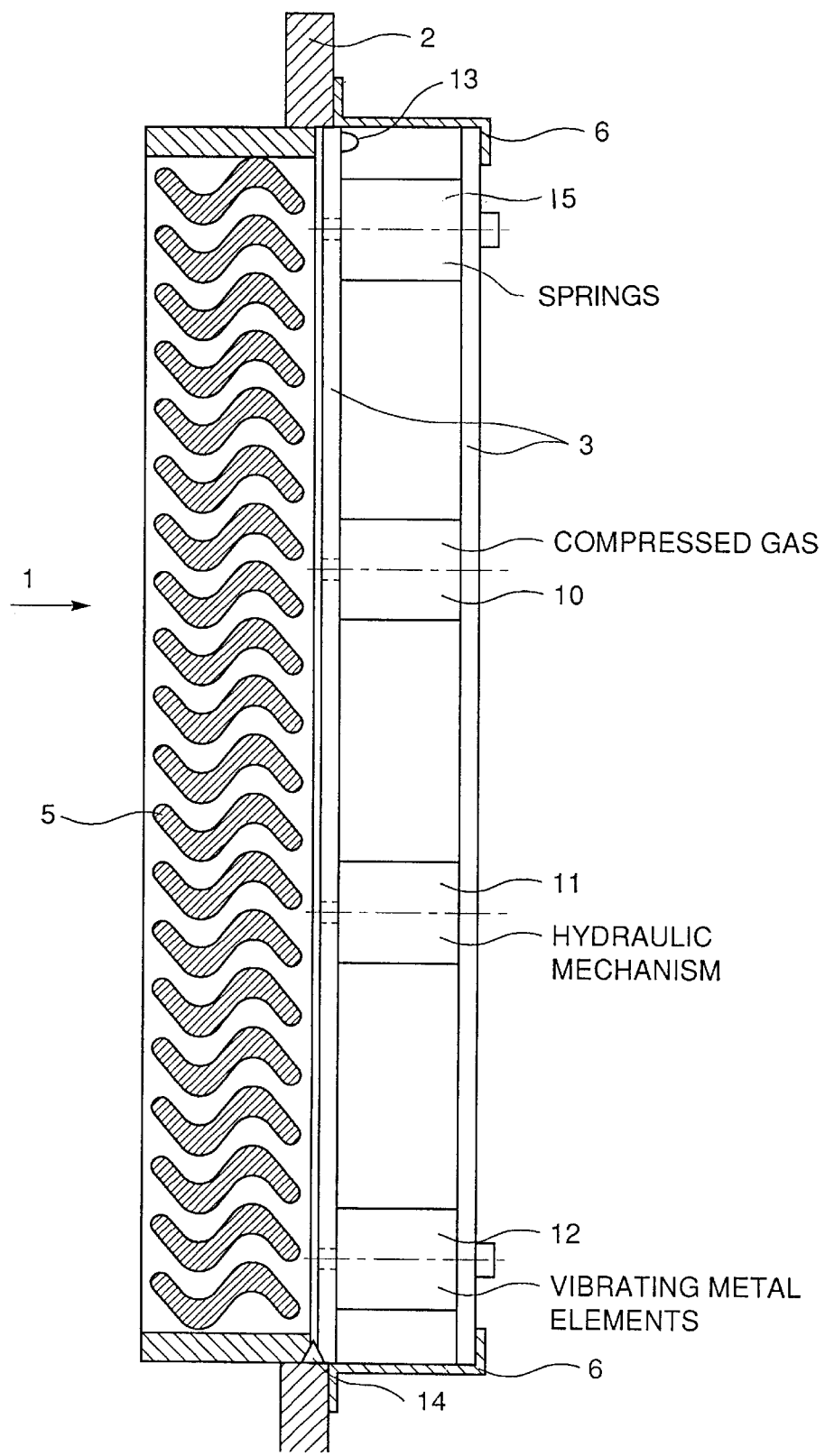
FIG. 3 is a further embodiment of the grating system and illustrates additional embodiments of the energy absorbers, according to the present invention.

The embodiment illustrated in FIG. 2 is intended for a connection in which energy absorbers 4 are directly employed for each strip 5 of structural section. The frame that accommodates strips 5 is divided into a rigid frame 1b wherein individual frame components 1a can move back and forth, each in conjunction with a separate strip of section. Each component 1a rests by way of an individual energy absorber 4 against rigid frame 1b and a spring limiter 7. The separate strips 5 of structural section can in the event of a strike or impact move along with moving frame component 1a against energy absorber 4 and accordingly absorb some of the kinetic energy. The overall grating system 1 is mounted on the wall 2 of an unillustrated special-purpose vehicle.

The energy absorbers 10 can be operated by compressed gas.

The energy absorbers can also be in the form of hydraulic mechanisms 11.

In another embodiment, the energy absorbers can be in the form of vibrating metal elements 12.

According to the present invention, the grating system can be releasable from the energy absorbers by, for example, fastening elements such as screws 13.

The grating system can also be made non-releasable from the energy absorbers by, for example, cement 14.

The energy absorbers, moreover, may be in the form of resilient elements such as springs 15, for example.

We claim:

1. A grating system with parallel strips of structural section forming air channels for an armored special-purpose vehicle, comprising: a movable frame for holding said strips; means for mounting said frame on said vehicle; and movable energy absorbing means between said vehicle and said strips for reducing breakup of material having kinetic energy on impact with said strips of structural section by absorbing a part of said kinetic energy through said energy absorbing means and resisting penetration of said material into said air channels for increasing ballistic defense of the grating system, said energy absorbing means and said frame moving upon said impact to absorb said part of said kinetic energy; said energy absorbing means being operated with compressed gas.

2. A grating system with parallel strips of structural section forming air channels for an armored special-purpose vehicle, comprising: a movable frame for holding said strips; means for mounting said frame on said vehicle; and movable energy absorbing means between said vehicle and said strips for reducing breakup of material having kinetic energy on impact with said strips of structural section by absorbing a part of said kinetic energy through said energy absorbing means and resisting penetration of said material into said air channels for increasing ballistic defense of the grating system, said energy absorbing means and said frame moving upon said impact to absorb said part of said kinetic energy; said energy absorbing means comprising hydraulic means.

* * * * *